March 24, 1959

C. R. MAYO ET AL 2,878,732

XEROGRAPHIC COPIER

Filed Jan. 3, 1955

INVENTOR
CLYDE R. MAYO
BY BERNARD J. WOLFE

Frank A. Steinhilper
ATTORNEY

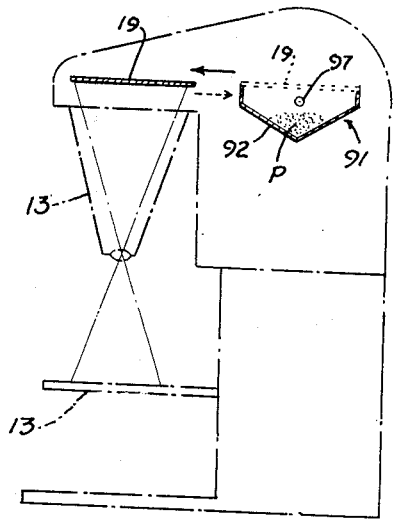
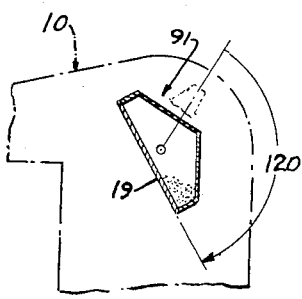
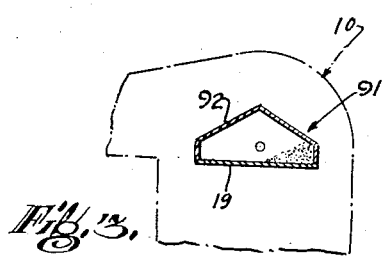
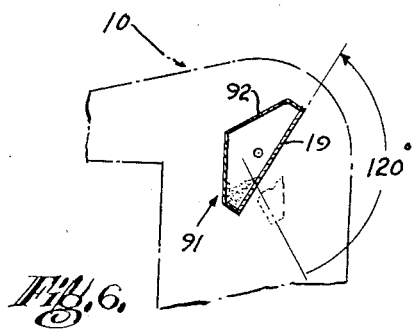
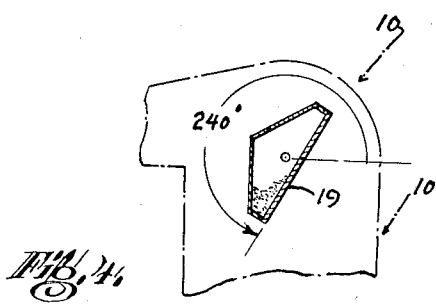
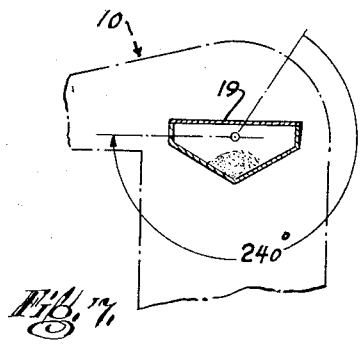

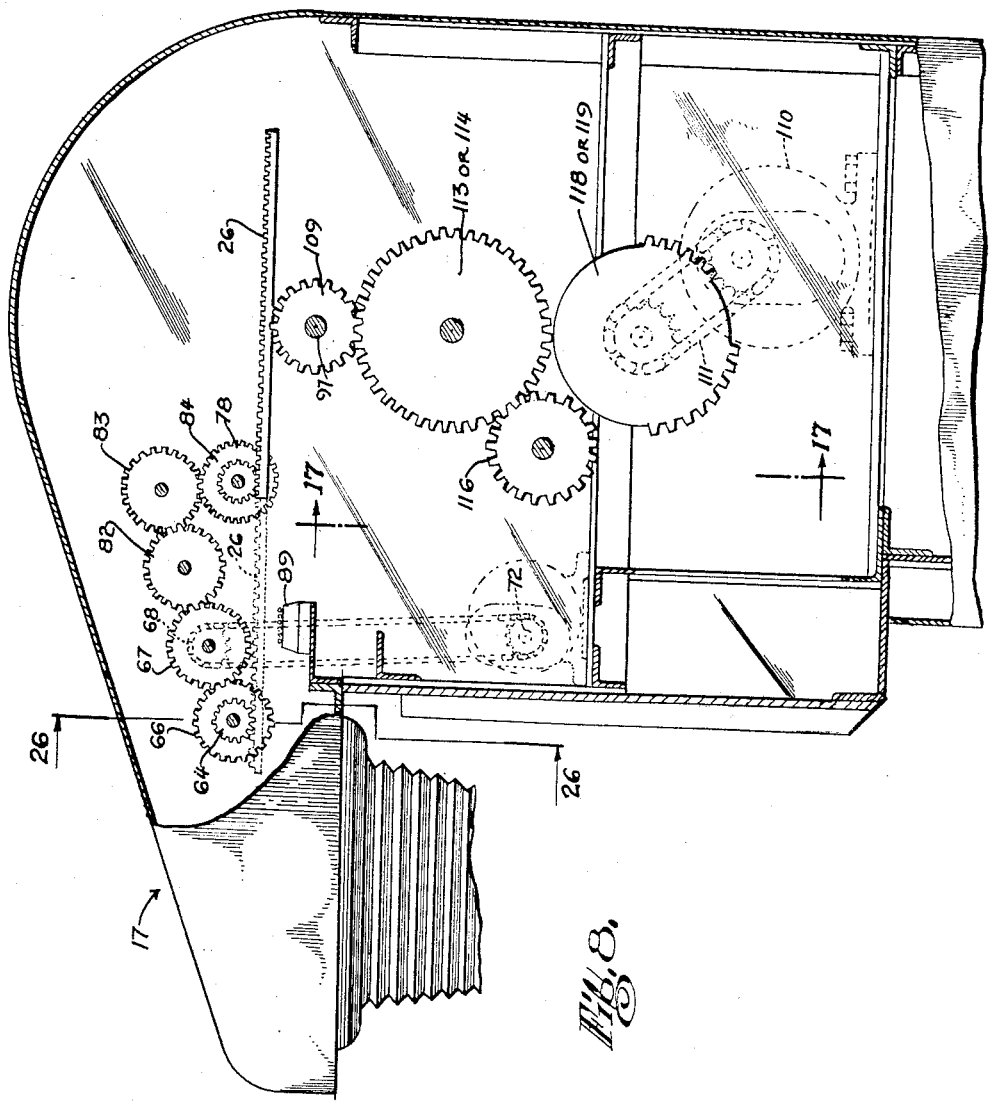

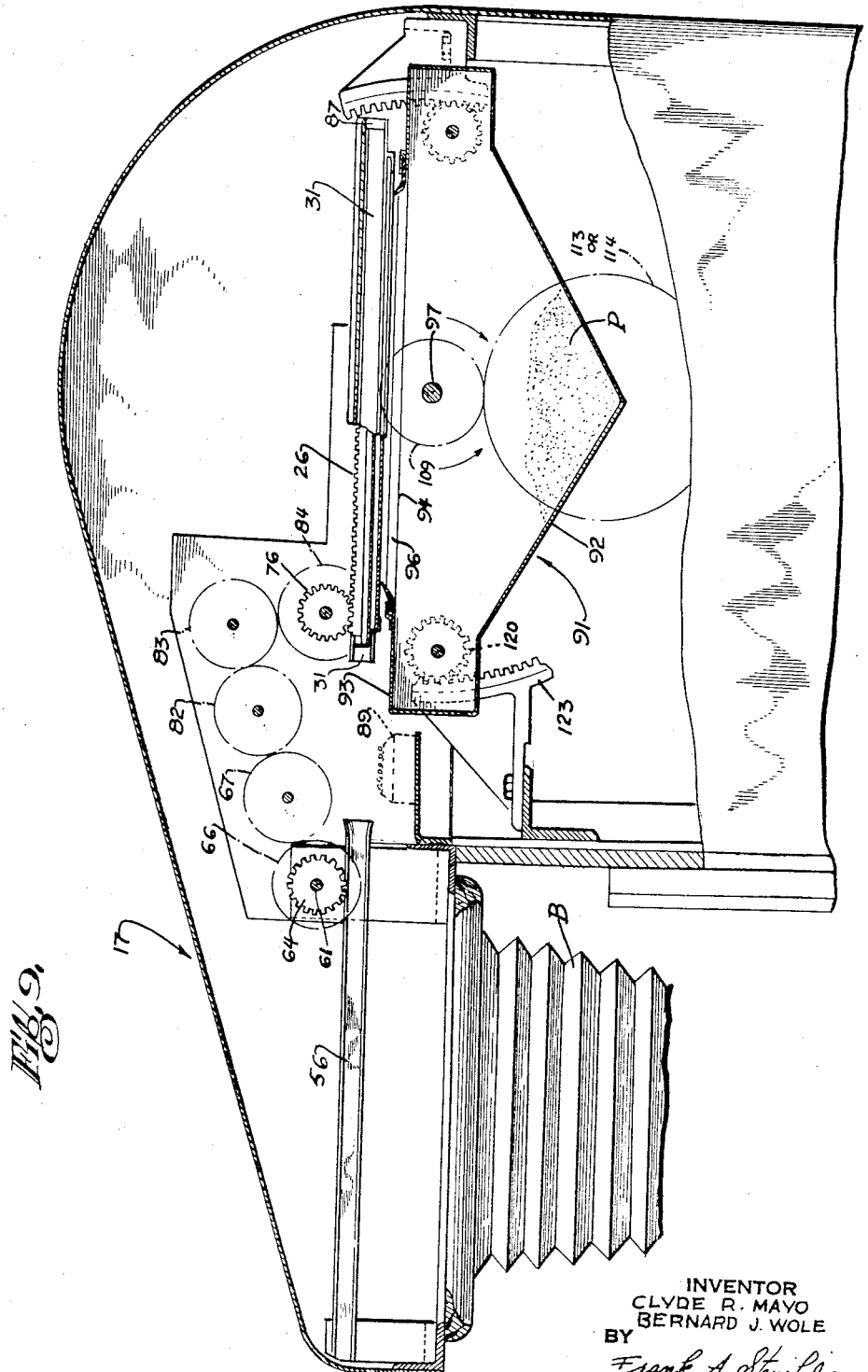

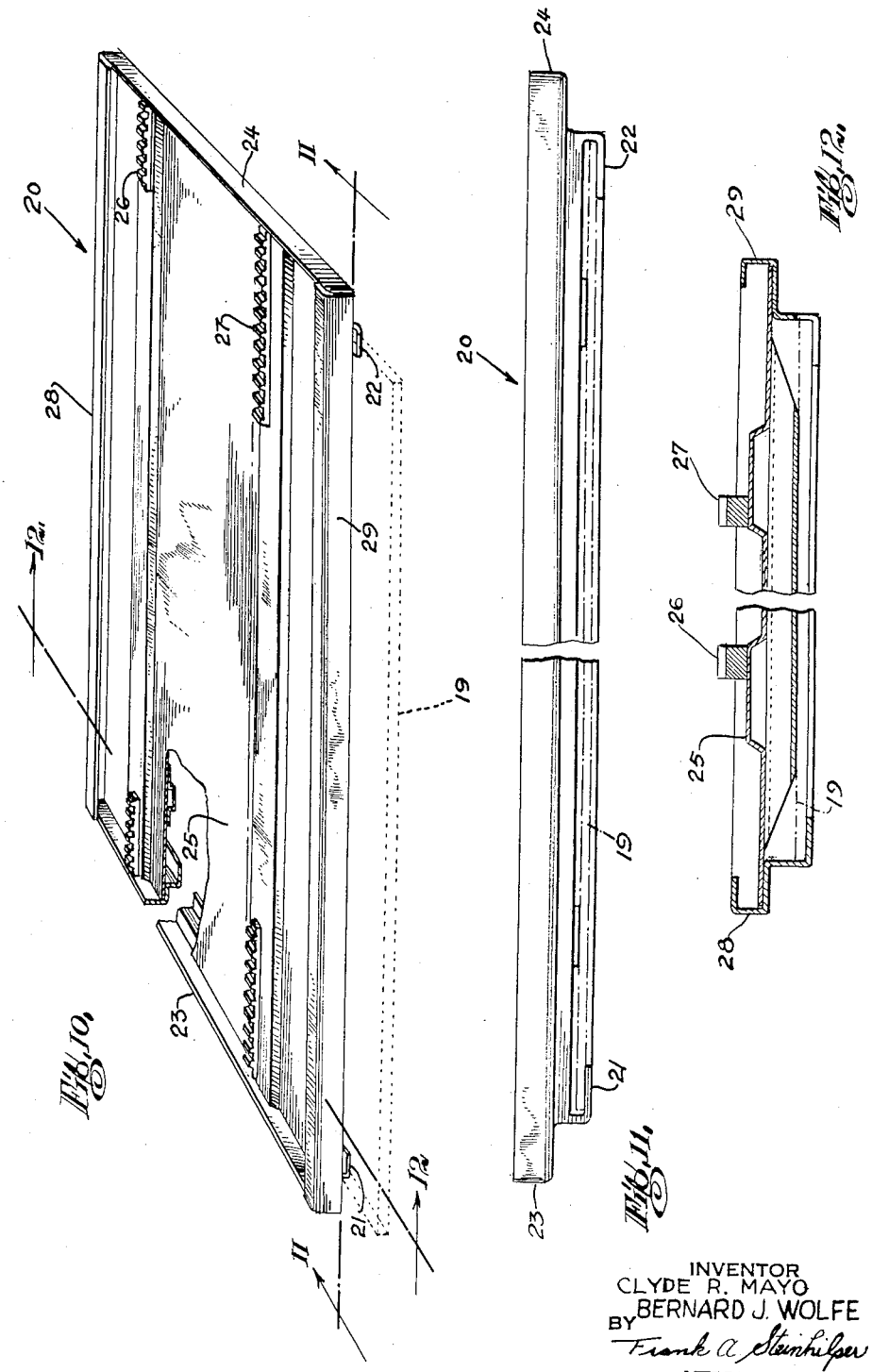

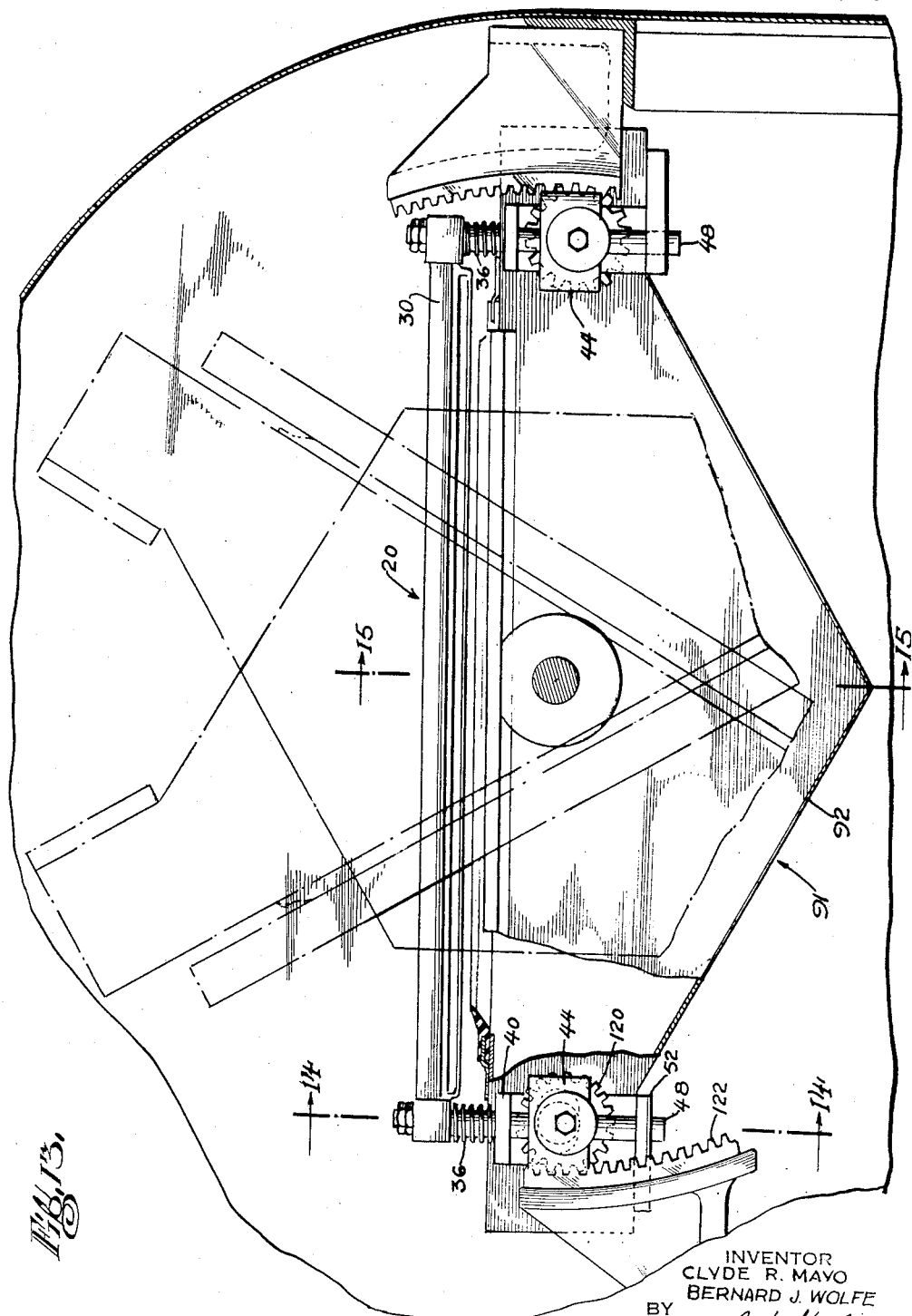

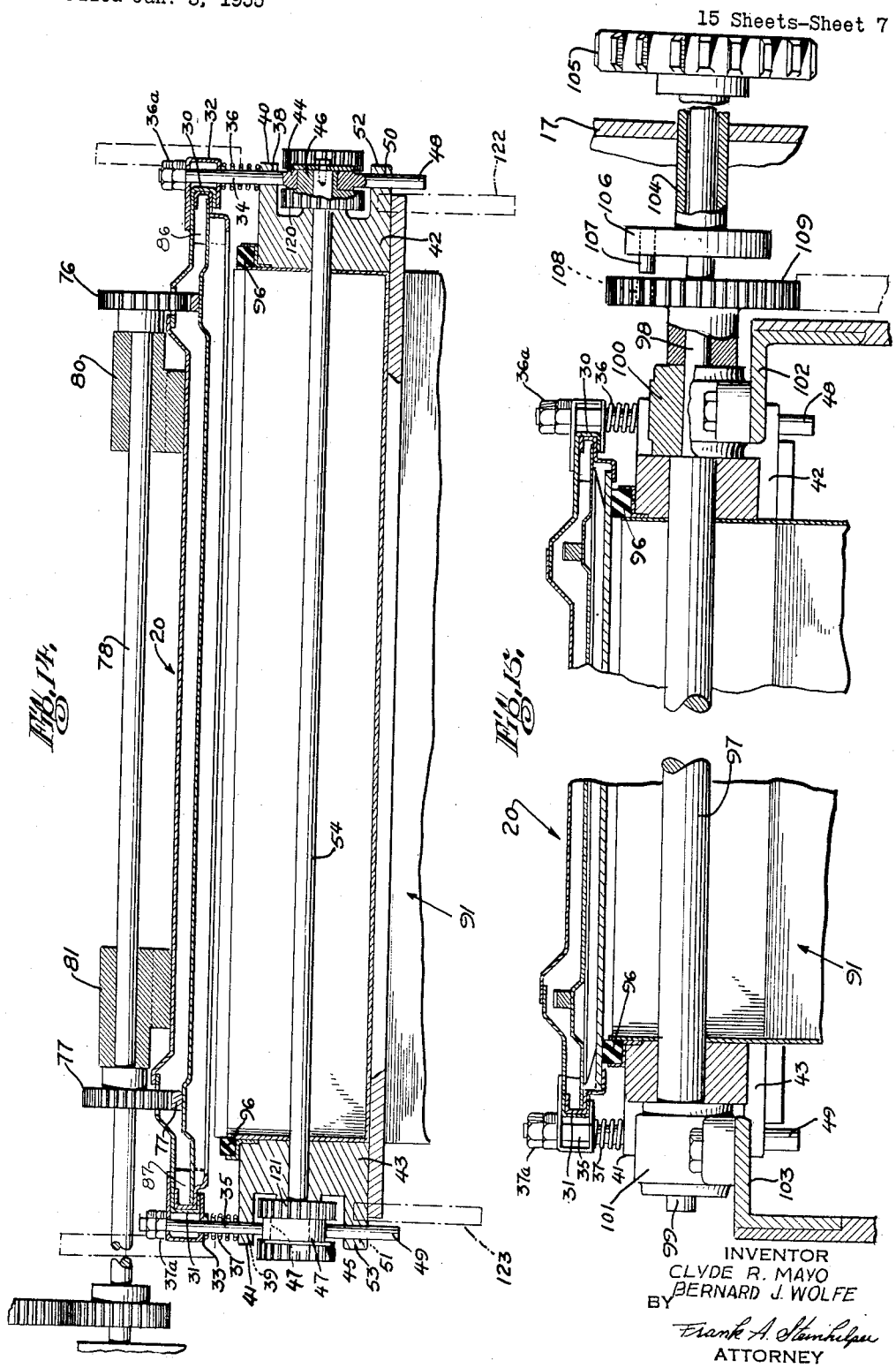

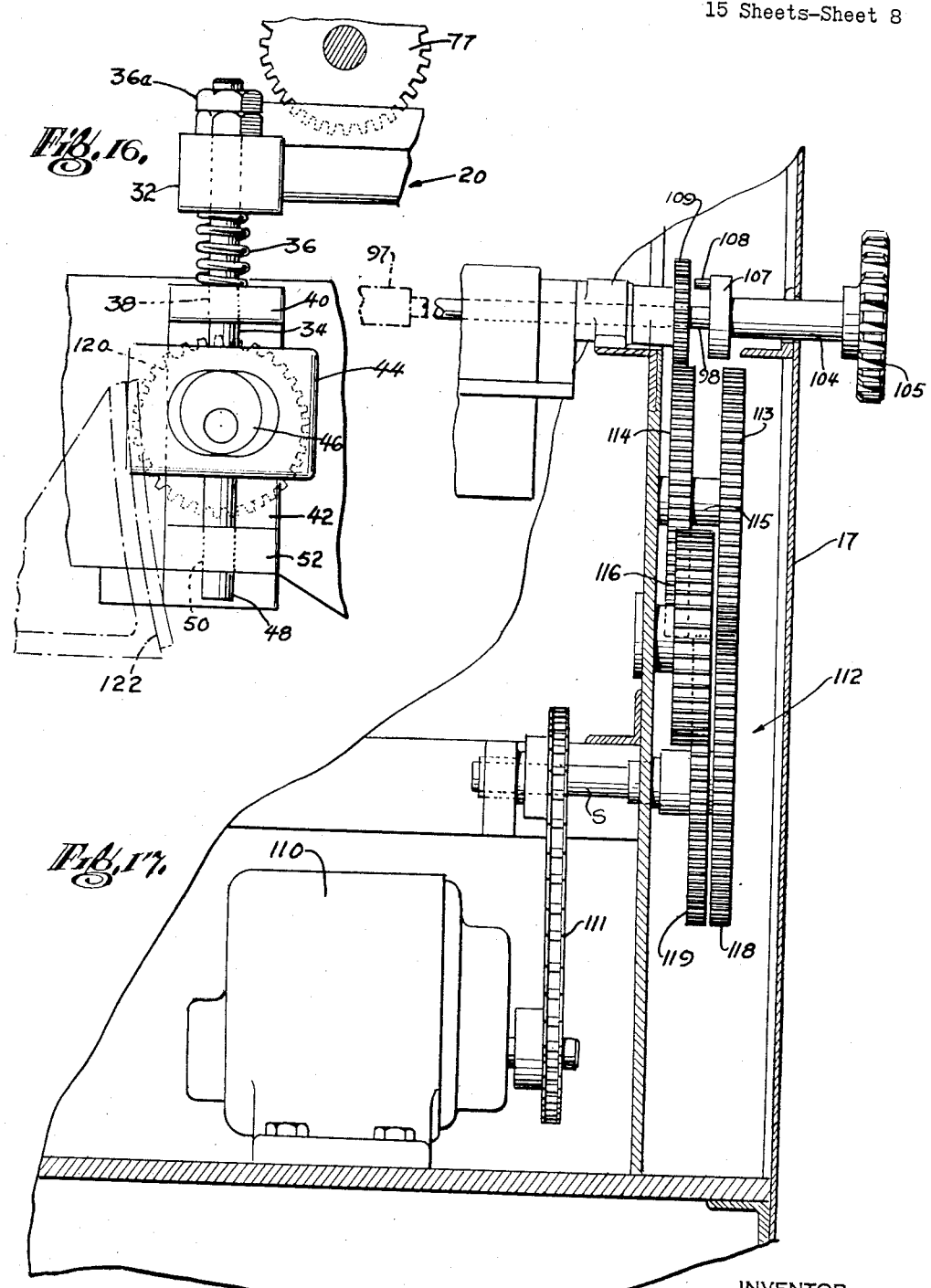

March 24, 1959  C. R. MAYO ET AL  2,878,732
XEROGRAPHIC COPIER
Filed Jan. 3, 1955  15 Sheets-Sheet 9
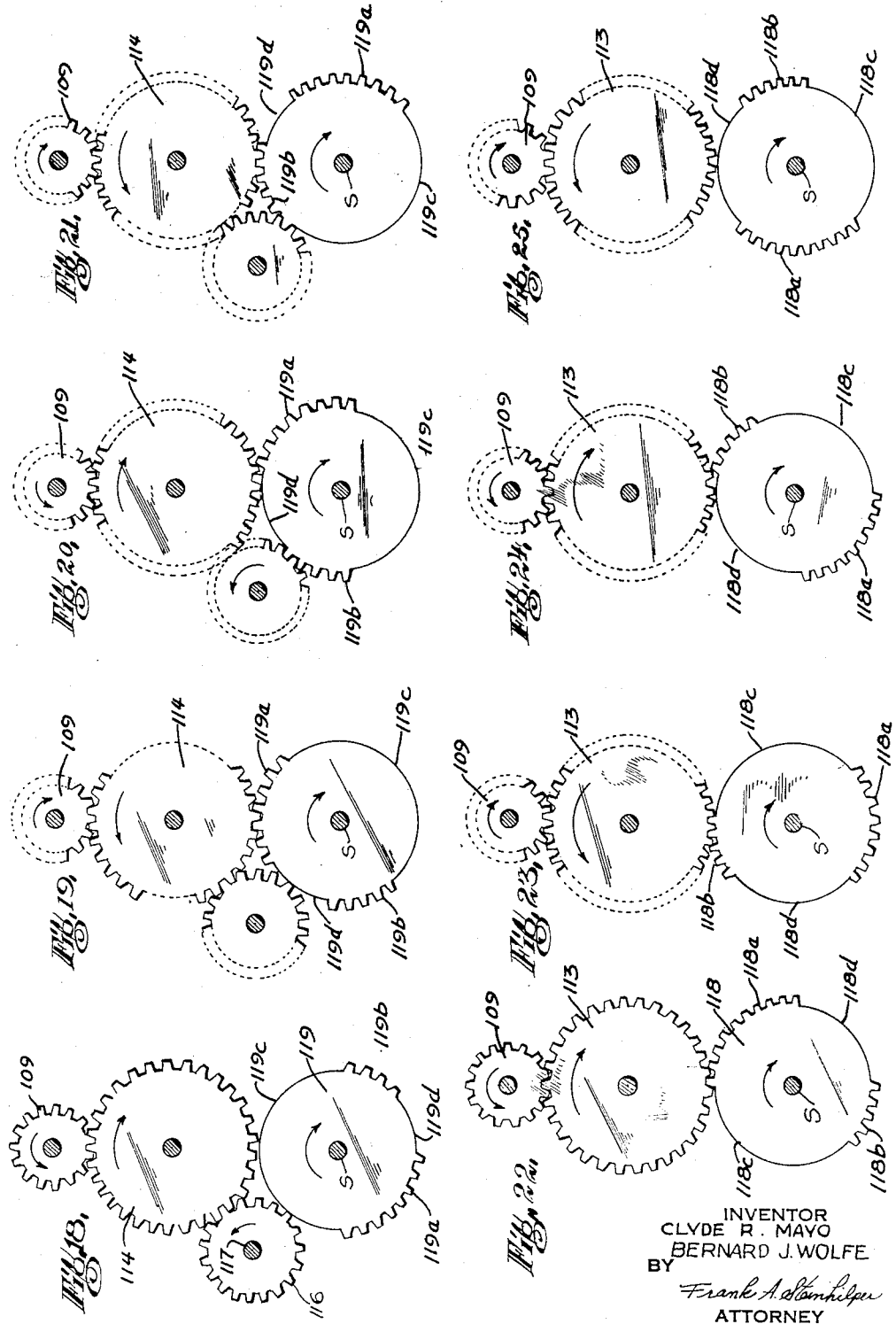
INVENTOR
CLYDE R. MAYO
BERNARD J. WOLFE
BY
Frank A. Steinhilper
ATTORNEY

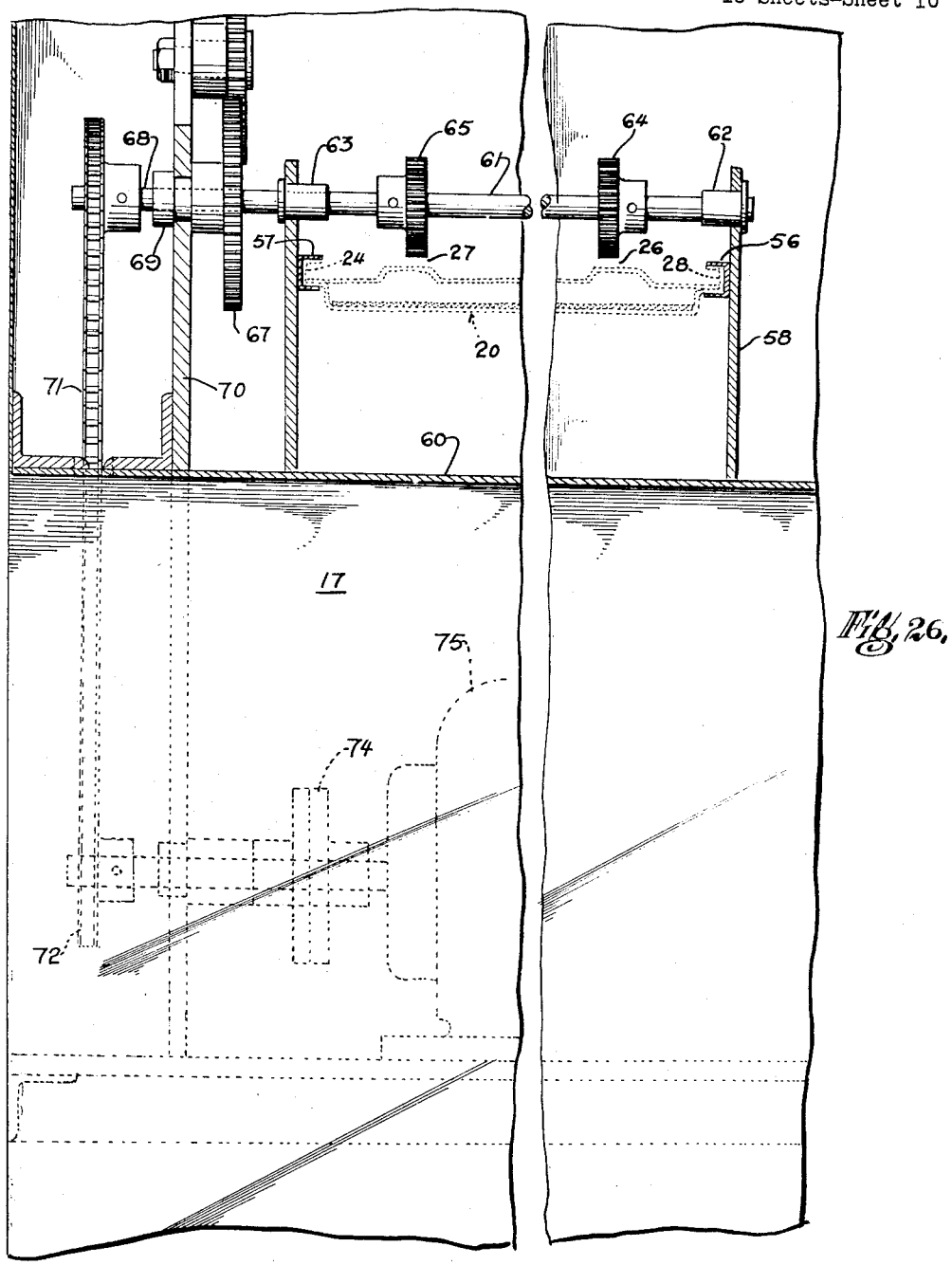

March 24, 1959　　　C. R. MAYO ET AL　　　2,878,732
XEROGRAPHIC COPIER
Filed Jan. 3, 1955　　　　　　　　　　　　　　15 Sheets-Sheet 11
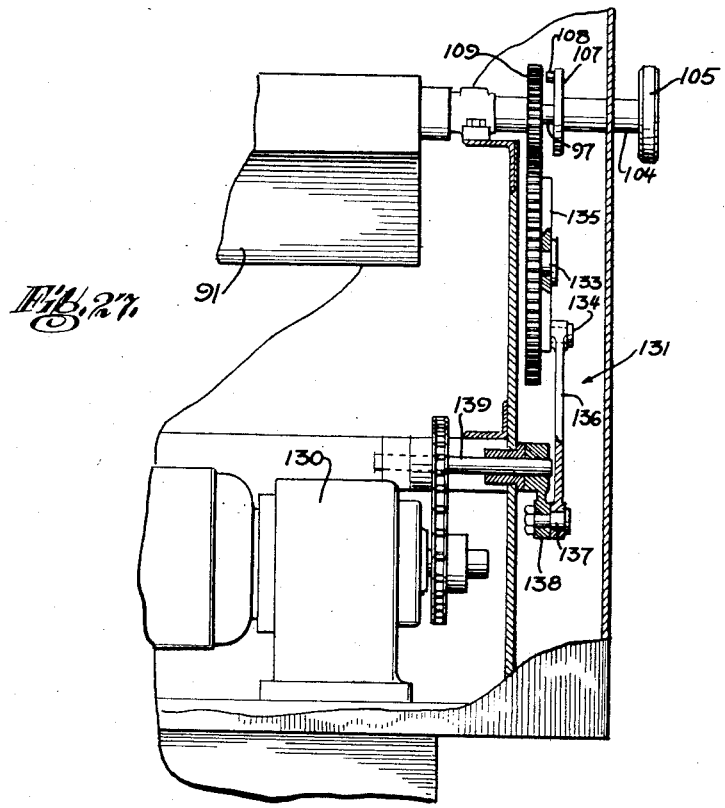
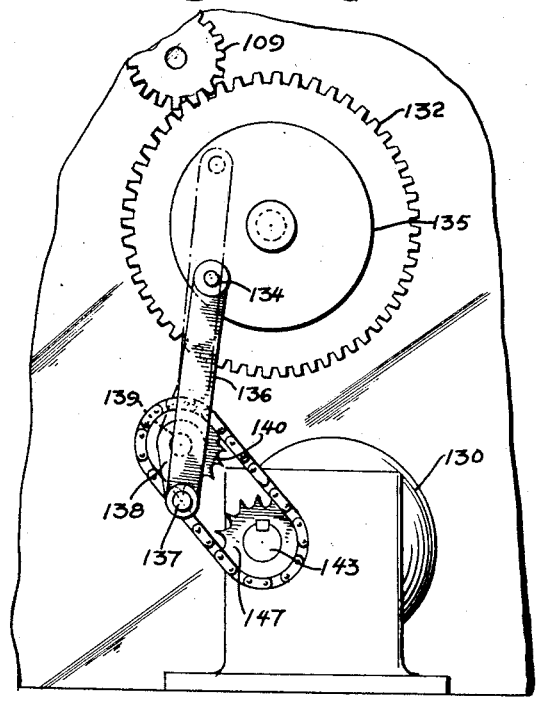
INVENTOR
CLYDE R. MAYO
BERNARD J. WOLFE
BY
*Frank A. Steinhilper*
ATTORNEY March 24, 1959

C. R. MAYO ET AL 2,878,732

XEROGRAPHIC COPIER

Filed Jan. 3, 1955

INVENTOR
CLYDE R. MAYO
BERNARD J. WOLFE
BY Frank A. Steinhilper
ATTORNEY

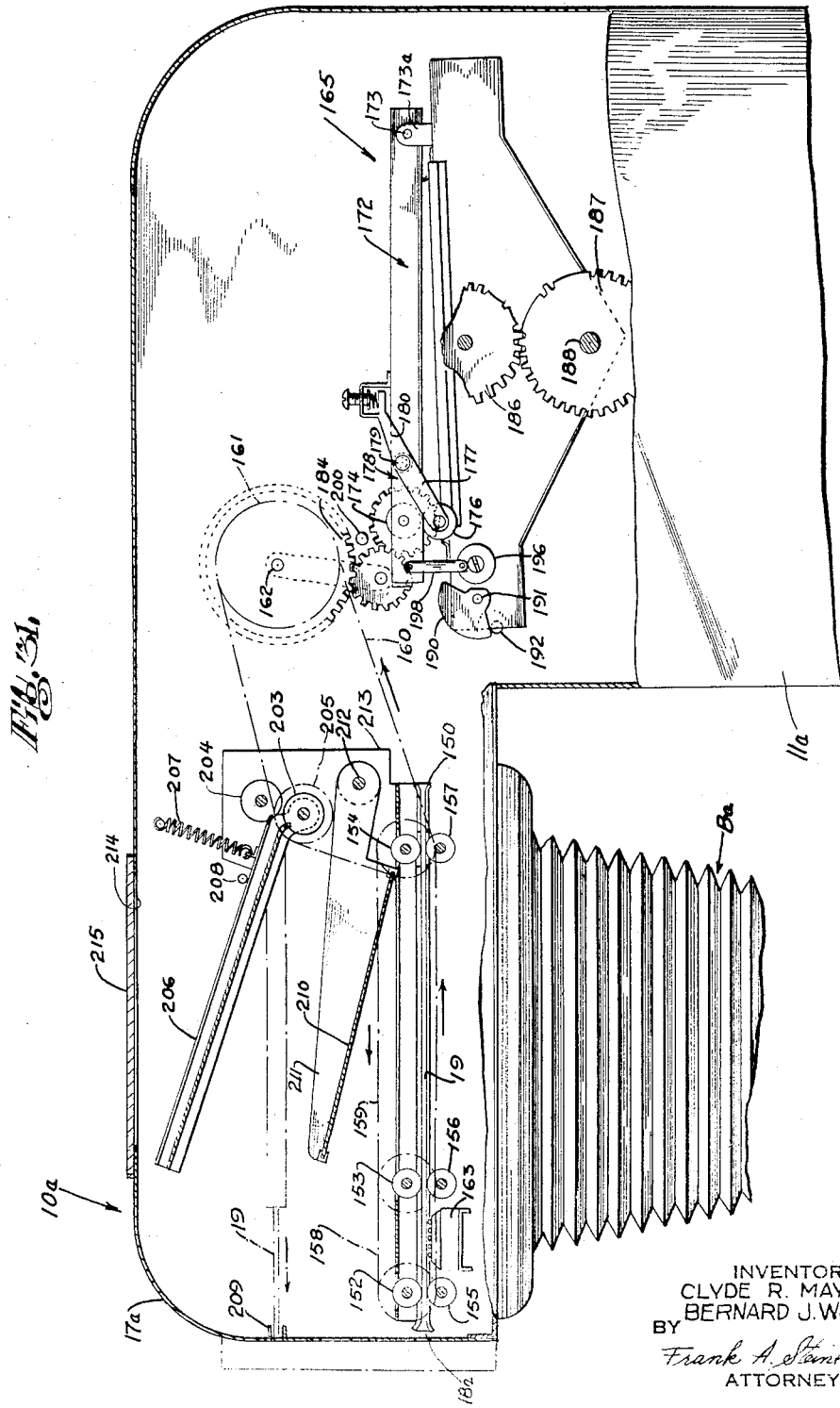

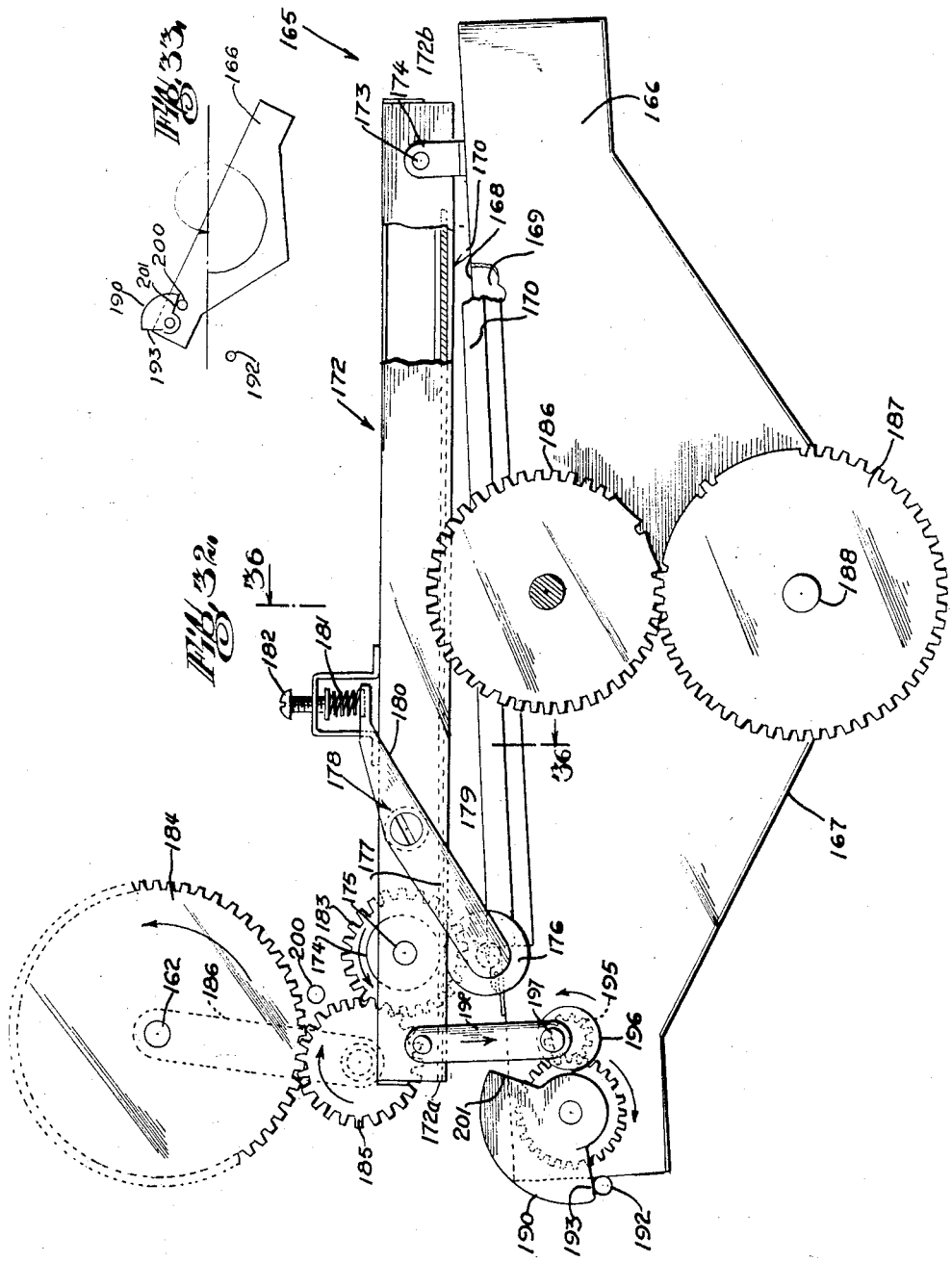

March 24, 1959
C. R. MAYO ET AL
2,878,732
XEROGRAPHIC COPIER
Filed Jan. 3, 1955
15 Sheets-Sheet 15
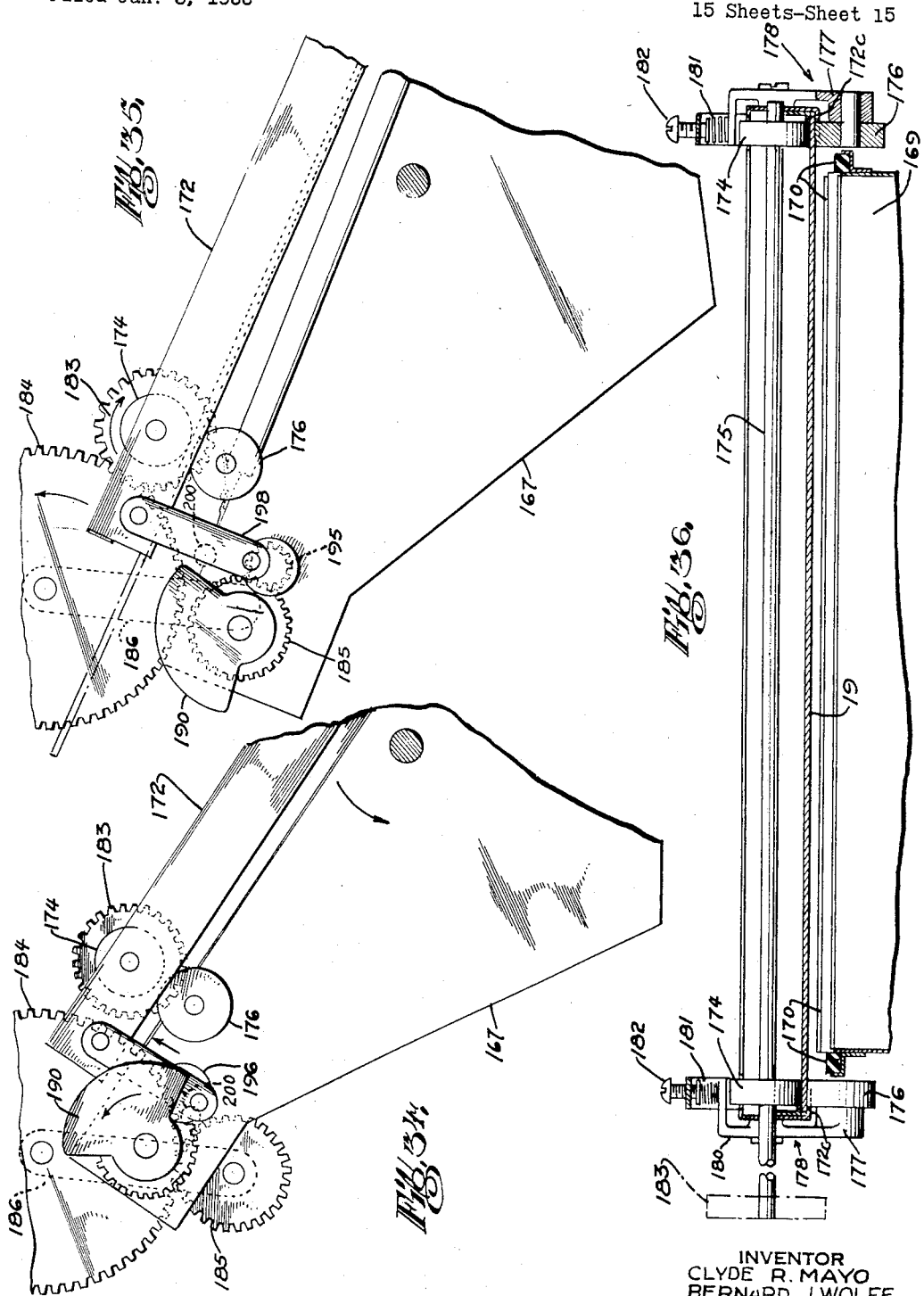
INVENTOR
CLYDE R. MAYO
BERNARD J. WOLFE
BY
Frank A. Steinhilper
ATTORNEY

United States Patent Office 2,878,732
Patented Mar. 24, 1959

2,878,732

XEROGRAPHIC COPIER

Clyde R. Mayo and Bernard J. Wolfe, Rochester, N.Y., assignors to Haloid Xerox Inc., Rochester, N.Y., a corporation of New York Application January 3, 1955, Serial No. 479,298

13 Claims. (Cl. 95—1.7)

The present invention relates to xerographic cameras and more particularly to devices of this character equipped with automatic charging and developing means.

Principal features and objects of this invention are the provision of xerographic devices of this character in which xerographic elements may be inserted, charged, exposed and developed in sequence within the device and removed from the latter bearing the developed image of the copy to which the element has been exposed.

Further objects and features of the invention embody the provision of structural features that will enable a single operator to operate the device simply, conveniently and quickly.

Further objects and features of the invention include the provision of transporting means within the device for moving xerographic elements inserted into it sequentially to its exposure, development and other necessary positions therein, and the provision of unidirectional driving means for operating the transporting means in required directions automatically.

Further objects and features of the invention include the provision of developer means of simple effective construction within the device to provide quality powder development of latent images on elements exposed in said device.

Further objects and features of the invention include the provision of developer means within the device carrying developer powder to be passed or cascaded across an exposed element for development of the latent image thereon and also including novel means for effecting required movement of the developer pan for cascading of the powder by the use of unidirectional driving means for activating the developer pan and including novel coupling means between said driving means and said pan.

Additional objects and features of the invention are to provide simple mechanical structure to accomplish the purposes of the invention economically and effectively.

Other objects and features of the invention will become apparent from the following specification and the accompanying drawings, wherein:

Fig. 1 is a perspective view of a xerographic device or camera embodying the invention and illustrating a manner of its use.

Figs. 2–7, inclusive, are diagrammatic views illustrative of successive steps in the use of the device from charging of an insert xerographic plate or element through exposure to development of the exposed xerographic element.

Fig. 8 is a side elevational view, partially broken away, of the upper portion of the device of Fig. 1 illustrating details of the plate transporting means and gear train mechanisms associated therewith;

Fig. 9 is a side elevational view also partially broken away of the upper portion of the device of Fig. 1, illustrating details of the plate carrier and developer pan constructions;

Fig. 10 is a perspective view of the carrier for the xerographic element or plate of the camera;

Fig. 11 is a side elevation of the element or plate carrier viewed along line 11—11 of Fig. 10 and in the direction of the arrows;

Fig. 12 is a transverse section taken along line 12—12 of Fig. 10 and viewed in the direction of the arrows;

Fig. 13 is a fragmentary view similar to that of Fig. 9 on an enlarged scale illustrating additional structural details of the plate carrier and developer pan arrangement;

Fig. 14 is a transverse section taken along line 14—14 of Fig. 13 and viewed in the direction of the arrows;

Fig. 15 is a transverse section taken along line 15—15 of Fig. 13 and also viewed in the direction of the arrows;

Fig. 16 is a fragmentary view of an enlarged scale of a structural detail at the left of Fig. 13;

Fig. 17 is a partial vertical section taken along line 17—17 of Fig. 8 and viewed in the direction of the arrows illustrating a side elevation of the developer pan operating gear train;

Figure 29:
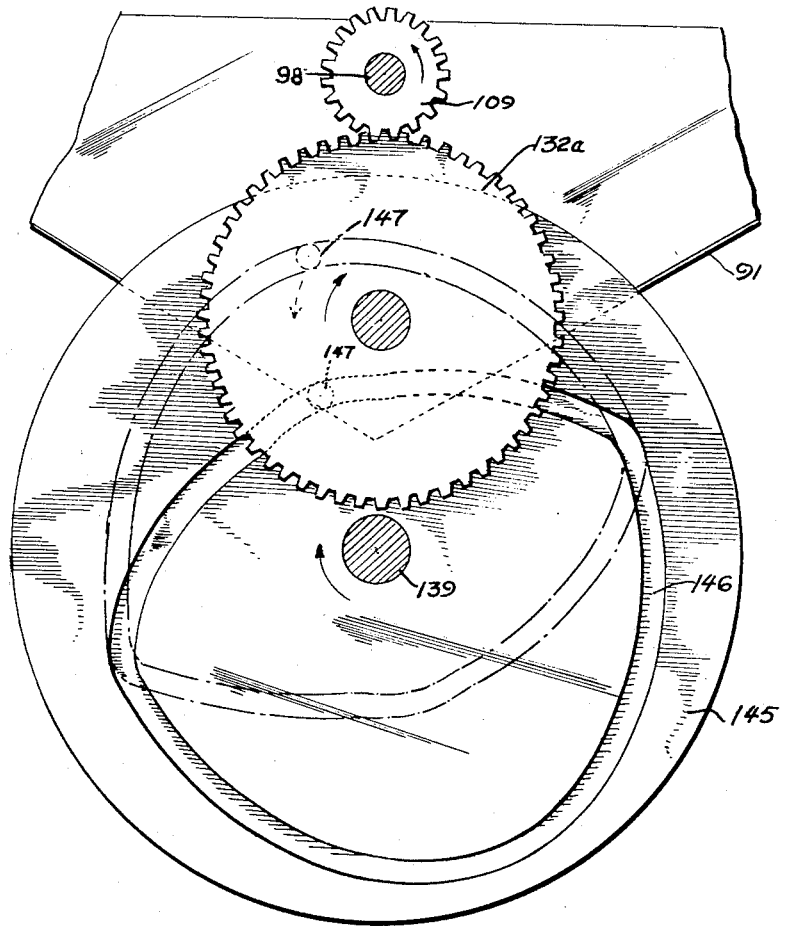
Figure 30:
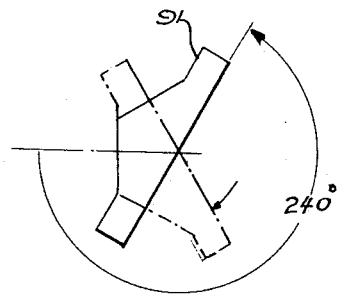

Figs. 18–25, inclusive, are diagrammatic illustrations of successive operational positions of the gears in the gear train of Fig. 17;

Fig. 26 is a vertical section taken along line 26—26 of Fig. 8 and viewed in the direction of the arrows illustrating primarily the gear train arrangement that actuates requisite movements of the xerographic plate carrier both for the exposure and for development of the plate or element;

Fig. 27 is a partially sectionalized side elevation of an alternative crank driven arrangement for rocking the developer pan;

Fig. 28 is an end elevation of the mechanism of Fig. 27;

Fig. 29 is an end elevation of an alternative cam arrangement for rocking the developer pan;

Fig. 30 illustratives diagrammatically the various positions assumed by the developer pan under control of the cam arrangement of Fig. 29;

Fig. 31 is a view similar to Fig. 8 of a modified arrangement provided with means for insertion of the xerographic plate or element at the front of the camera, of means for charging the inserted plate, of means for transporting the element after charging to an exposure position, of means for subsequently developing the exposed plate or element;

Fig. 32 is illustrative on a larger scale of structural details of the Fig. 31 mechanism for developing the exposed plate;

Fig. 33 illustrates diagrammatically the positions of the development pan of Figs. 31 and 32 during development;

Figs. 34 and 35 are illustrations of successive positions of the developer pan and associated mechanisms of Fig. 32; and Fig. 36 is a partial transverse section taken along line 36—36 of Fig. 32 and viewed in the direction of the arrows.

Figure 1:
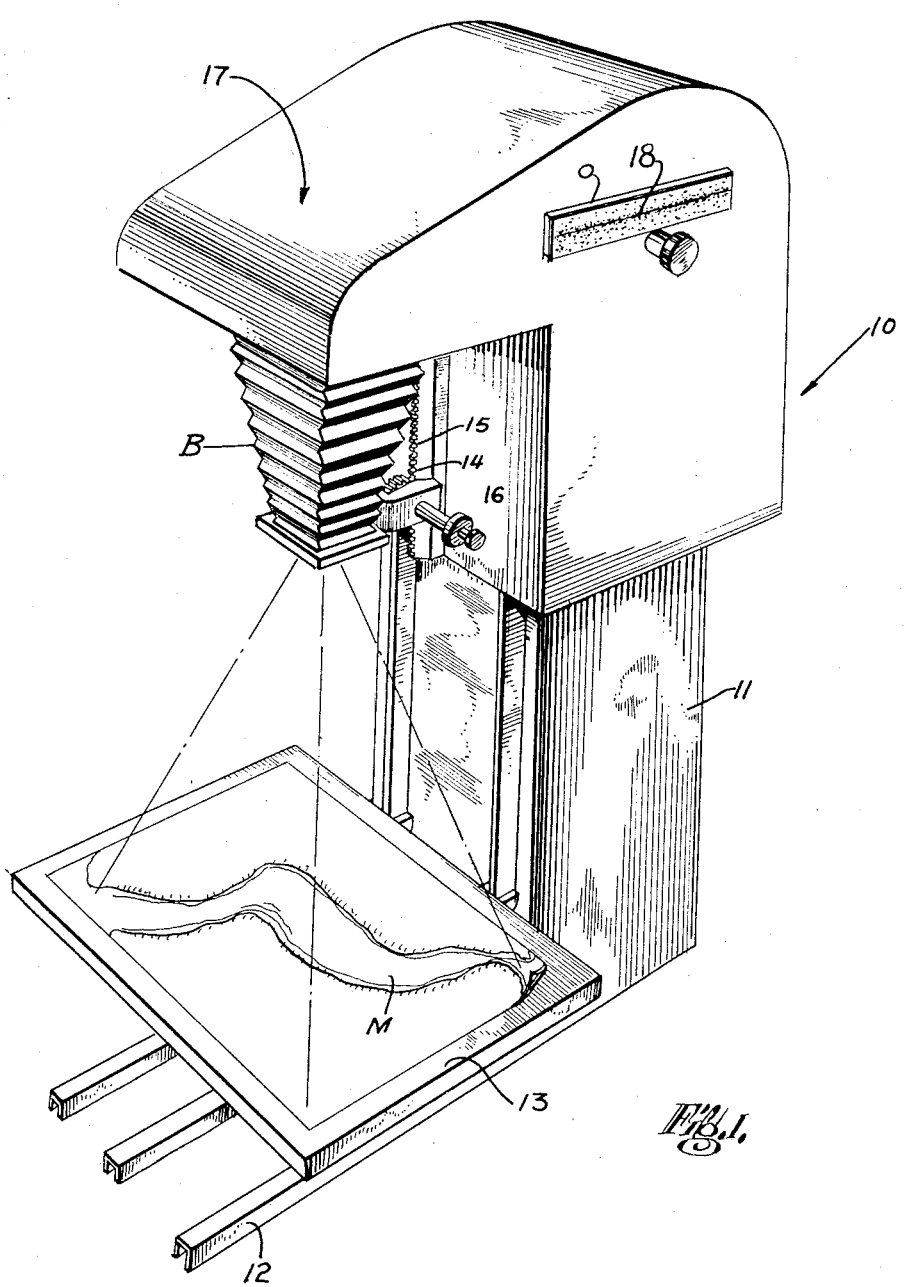

Referring to the drawing and first to Fig. 1, the reference character 10 denotes the xerographic device or camera embodying the invention which is mounted for vertical adjustment on a pedestal 11. The base 12 of the pedestal is adapted to receive and horizontally support a conventional frame 13 bearing the image or other material to be copied, for example, a map M.

The lens system (not shown) carried on the outer end of a bellows B in conventional manner is adjustable for focusing relative to the image on base 12 in conventional manner as, for example, by the gear 14 and rack 15 on which gear 14 is rotatable by the adjustment knob 16. The other end of bellows B opens into an enclosing casing or housing 17 which carries the operative mechanisms of the device 10. These mechanisms include a plate carrier or holder for receiving and transporting a xerographic plate or element during charging, exposure and development stages within the device, a charging mechanism for charging the xerographic element and developing mechanism for developing the latent image existing on the xerographic plate element after its exposure.

In the embodiment of the invention shown in Figs. 1–26, the xerographic plate or element is inserted into the camera via a side opening O in the casing 17 and onto a plate carrier or holder located at a home position rearwardly of the focal exposure plane. The element loaded carrier or holder is transported forwardly from its home position to an exposure position in the focal plane of exposure and during this motion the plate or element thereon is charged to required potential. The plate or element is exposed in the exposure position and then the plate-loaded carrier is returned to the home position over a developer pan. The developer pan is then rotated or oscillated causing developer powder in it to pass or cascade across the surface exposed plate or element. Dust tight sealing relationship between the element or plate and the developer pan is maintained during rotation and oscillation of the developer pan and exposed plate. After development is complete the developed plate or element is moved to a position whence it can be removed readily from the device by the operator.

In another embodiment of the invention the xerographic element is inserted into the device at its front rather than at its side. This makes it more convenient for a single operator to handle both the xerographic plate or element and the original being copied. In this second embodiment, the inserted plate or element is transported by feed rolls over a charging device and into the exposure position where it comes to rest for automatic exposure. After exposure the plate transporting mechanism moves the xerographic plate or element over the developer pan assembly. The plate or element and the assembly are then rotated and oscillated and development occurs in manner similar to that in the first embodiment. After development is complete the plate and its carrier come to rest at an angle and then the transporting mechanism feeds the developed plate to a position whence it can readily be removed by the operator from the front of the device.

*Side entrance types*

The side entrance embodiments of the device or copier are illustrated in Figs. 1–30, inclusive, and will be described first. With these embodiments the casing 17 includes entrance opening 18 provided with a light seal (not shown) of conventional construction at one side of the casing 17 through which the xerographic element or plate 19 may be inserted into said casing. The opening 18 in this embodiment is horizontally disposed and aligned with a home position of a moveable plate or element carrier 20 for said xerographic plate or element.

*Element carrier*

The element carrier or holder 20 (Figs. 10–12, inclusive) comprises a frame work which is generally rectangular in shape and which has a pair of oppositely located plate supporting flanges 21 and 22 positioned in a spaced position from the underside of the frame 20. The xerographic plate or element 19 is slidable into supported position from these flanges when it is inserted into casing 17 via opening 18. Preferably the element 19 has its usual photoconductive image layer facing downwardly when it is inserted into carrier 20. The flanges 21 and 22 extend transversely across the width of the frame 20, being located adjacent its opposite narrower rims 23 and 24. A cover plate 25 spans the frame 20 above the flanges 21 and 22.

A pair of spaced apart racks 26 and 27 overlying cover plate 25 span the longer dimension of the frame 20 being parallel with its longer rims 28 and 29. These racks 26 and 27 face upwardly from the cover plate 25 and are used in a manner to be described to transport or move the carrier frame 20 from its home position to various other positions in the device 10.

*Carrier support and guide mechanism*

The carrier 20 is movably supported in the oppositely located guide rails 30 and 31 (Figs. 14, 15 and 16) into which the rims 28 and 29 respectively may be slid. These guide rails 30 and 31 are mounted on the respective brackets 32 and 33 and the latter in turn are slidably supported on the respective guide posts 34 and 35. Biasing springs 36 and 37 on the posts 34 and 35 serve to urge the frames 32 and 33 outwardly on posts 34 and 35 against the post end nuts 36a and 37a.

Posts 34 and 35 extend slideably through guide openings 38 and 39 in flanges 40 and 41 of frame parts 42 and 43 and are connected to cam follower yokes 44 and 45 in which the respective cams 46 and 47 operate. Posts 48 and 49 aligned with the respective posts 34 and 35 extend from the yokes 44 and 45 through guide openings 50 and 51 in flanges 52 and 53 of the respective frame parts 42 and 43. The cams 46 and 47 are keyed or fixed to a shaft 54 which extends between the frame parts 42 and 43. Rotation of shaft 54 and with it cams 46 and 47 at appropriate times in a manner to be presently described causes movement of the frames 32 and 33 and carrier guide rails 30 and 31 toward and away from the frame parts 42 and 43 for purposes presently to be described.

Fixed guide rails 56 and 57 (Figs. 9 and 26) are supported horizontally by fixed vertically disposed frame parts 58 and 59 in horizontal alignment respectively with the uppermost elevational levels of the vertically movable guide rails 30 and 31 so that during such alignment the frame 20 may be transferred or transported from its home position on the movable guide rails 30 and 31 to an exposure position wherein it is supported solely on the fixed guide rails 56 and 57. The fixed frame parts 58 and 59 are secured to a fixed horizontally disposed frame part 60.

*Carrier transport mechanism*

A shaft 61 (Fig. 26) is supported by the bearings 62 and 63 on the vertical frame parts 58 and 59 above the level of the fixed guide rails 56 and 57. Pinions 64 and 65 are secured to shaft 61 to rotate with it and are adapted to mesh with the respective racks 26 and 27 of carrier 20. Rotation of pinions 64 and 65 in appropriate direction will either move the carrier 20 horizontally into the guide rails 56 and 57 from its home position in guide rails 30 and 31 or back toward and into the latter.

A gear 66 (Fig. 8) is secured to the shaft 61 and meshes with a driving gear 67 which is fixed to a stub drive shaft 68 mounted by a bearing in a vertical fixed frame part 69 (Fig. 26). A sprocket gear 70 also fixed to stub shaft 68 is coupled by a drive chain 71 to a sprocket gear 72. This gear 72 is secured to a shaft 73 which is coupled through a slip clutch 74 to a reversible drive motor 75. Motor 75 is supported in any conventional way within the casing 17 below the frame part 60.

A second pair of pinions 76 and 77 (Figs. 8, 9 and 14) are fixed to a horizontally disposed shaft 78 which is rotatively supported in bearings 80 and 81. Pinions 76 and 77 respectively are also meshable with respective racks 26 and 27 of the carrier 20. These pinions 76 and 77 are driven in unison with the pinions 64 and 65 through the gear train comprising intermeshing gears 82, 83 and 84 of which gear 82 is in mesh with driving gear 67 which rotated by motor 75 as herein described. Gear 84 of said train is secured to the shaft 78 carrying pinions 76 and 77.

End closures or abutments 86 and 87 (Figs. 9 and 13) in this embodiment at the right hand ends of movable guide rails 30 and 31 provide limiting stops to the rightward movement of carrier 20 in said guide rails and thus determine its home position. Similar end closures (not shown) at the left ends of fixed guide rails 56 and 57 provide limiting stops to the leftward movement of carrier 20 from its home position in movable guide rails 30 and 31 to its exposure position in the fixed guide rails 56 and 57. The guided movements of the carrier 20 in the guide rails 30, 31 and 56, 57 is effected by operating motor 75 to rotate the driving gear 67 either in counter-clockwise or clockwise direction as is required. In the embodiment shown, as seen in Fig. 8, motor 75 is first driven in counterclockwise direction causing transport of the carrier 20 from its extreme right or home position to its extreme left or exposure position through operation of the pinions 78, 79 and 64, 65 on the respective racks 26 and 27. Friction clutch 74 prevents motor damage when the carrier 20 strikes the stops.

Element charging means

During movement of the carrier 20 from its home position to its exposure position means are provided to charge the usual photoconductive image layer of material on the xerographic plate or element 19 electrostatically. The electrostatic charging means in the embodiment shown are preferably corona discharge elements including the wires or means 89 (Figs. 8 and 9) which are supplied with a high potential electric current through their conductors (not shown) in a switch-controlled circuit (not shown) so that an energizing charge is sprayed onto the image layer of the xerographic plate or element 19 as the latter borne in carrier 20 is transported from the aforesaid home position to its said exposure position.

In this embodiment, the image layer of the xerographic plate or element 19 is charged to its desired potential and polarity by supplying the corona discharge means with a current having, for example, a voltage peak between the charging wires or means and the insulating photoconductive layer of element 19 of from 5000 to 8000 volts or more. Any suitable high voltage source either D.C. or rectified A.C. can be employed, the electrical mechanism being of convenient form to impose a high potential electrostatic charge on the said image layer. Appropriate switching devices (not shown) are included in the electric circuit supplying the required charging current so that the supply will be switched on at the required time during transporting movement of the plate carrier 20, namely, when it bears an element 19 and is being moved from its home position to its exposure position. Other conventional means for charging element 19 prior to its exposure may be utilized if desired.

Development means

The cycle of operations contemplated in the camera of this invention includes a development stage occurring after exposure of the plate or element 19 to develop the latent electrostatic image created by the exposure of the image layer of said element. Development of such a latent image as is known in the xerographic art includes the cascading or passing of electroscopic developing powder over the latent image bearing surface of the exposed xerographic plate or element. Preferably this powder carries a triboelectric charge of opposite polarity to that of the latent image charge on the plate or element 19 so that when the powder passes over the latent image charge it is attracted and adheres to the surface carrying the latent image so as to cover the latent image substantially and to form a powder image corresponding to said latent image existing in the photoconductive layer of said element.

In the embodiment shown, a developer pan or open tray 91 (Figs. 9, 13 and 15) is positioned to lie below the home position of the carrier 20. This pan 91 has a closed, substantially V-shaped bottom 92 in which developer powder P may be returned. The top 93 of the pan has an opening 94 of substantially rectangular shape provided with an upwardly extending resilient peripheral flange 96 of rubber or the like insulative material whose dimensions define an area equal to or somewhat larger than the area that is usually exposed in the exposure position of the xerographic element or plate 19.

The developer pan 91 is supported by a horizontally disposed shaft 97 whose opposite ends 98 and 99 extend into bearings 100 and 101 which are supported from fixed frame parts 102 and 103 of the casing 17. The developer pan 91 is adapted to be rocked or oscillated by appropriate rotation of its supporting shaft 97 either manually or automatically as desired. To this end a sleeve 104 is slidably keyed on the shaft end 98. This sleeve extends outwardly of casing 17 and terminates in a knob 105 which may be manipulated by hand to rock shaft 97 through its extension 98 and hence rock pan 91. The inner end of sleeve 104 terminates in a disc 106 having a lateral protruding pin 107 which may be moved by knob 105 into and out of coupling engagement with an opening 108 in a gear 109 which is rotatively borne on the shaft 98. When the pin 107 is coupled to gear 109, the latter is driven from a motor 110 (Fig. 17) through a chain drive 111 and a gear train denoted generally by the reference character 112. Preferably the operation of motor 110 is unidirectional.

The gear train 112 is adapted to provide oscillatory rotary motion to pan 91 into the successive positions of said pan which are shown diagrammatically in Figs. 2–7, inclusive, notwithstanding unidirectional drive of motor 110.

The original or home position of the development pan 91 is that shown in Fig. 2 wherein its open top lies directly under the home position of the plate carrier 20 and its bottom 92 is in normal position.

The first action of the gear train 112 when the motor 110 is driven is to rotate the pan 91 in the direction of the arrow in Fig. 3 so that the bottom 92 now is located at the top, and then further rotates the pan to a position approximately 240° from its home or starting position of Fig. 1.

The gear train 112 then acts to rock or rotate the pan 91 in a reverse direction for 120° so that it assumes the position of Fig. 5, and so then again reverses rocking or rotational direction 120° to bring the pan 91 into the position of Fig. 6. The gear train 112 then again reverses rocking or rotational direction of pan 91 and swings it through an arc of 240° to the position of Fig. 7 which is similar to that of Fig. 2, namely, restoring the pan 91 to its original home position.

To effect these movements the gear train 112 comprises a pair of full tooth gears 113, 114 both secured on a stub shaft 115 (Figs. 17–25) of which gear 114 meshes with gear 109 so that drive of either gear 113 or 114 drives gear 109. A full toothed idler gear 116 supported on a stub shaft meshes with gear 114.

A pair of partially toothed gears 118 and 119 are secured directly to a driven shaft S which is rotated by the chain drive 111 from motor 110. Gear 118 is positioned so that its teeth will mesh with gear 113 while the gear 119 is positioned so that its teeth will mesh with idler gear 116.

The gear 118 has separate toothed portions 118a and 118b spaced by the respective long and short smooth or coast portions 118c and 118d. Similarly, the gear 119 has separate toothed portions 119a and 119b spaced by the respective long and short smooth or coast portions 119c and 119d. Toothed segments 118a and 119a on the coaxially mounted gears 118 and 119 are in out of phase relationship. Similarly, the toothed segments 118b and 119b are disposed in out of phase relationship. The longer and shorter smooth or coast portions 118c and 118d of gear 118 also are out of phase with the longer and shorter smooth or coast portions 119c and 119b of gear 119.

With this described arrangement of gears in the gear train 112 it is possible with one way or unidirectional drive of the motor 110 to effect the successive developer pan positions shown in Figs. 2–7, inclusive, for each revolution of the coaxially mounted gears 118 and 119.

For example, in Figs. 18 and 22 the gears 118 and 119 are shown in their initial positions in the first of the stages of rocking cycle of the developing pan 91, namely, their positions when the pan 91 is being moved from its home location shown in Fig. 2 to the position of Fig. 4. Both gears 118 and 119 are driven clockwise. The smooth or dwell portion 118a of gear 118 is then opposite the teeth of gear 113 and in consequence rotation of gear 118 has no effect on gear 113. Toothed section 119a of gear 119, however, at this time is approaching in mesh with idler gear 116 and when it meshes drives it counterclockwise. Gear 116 in turn being in mesh with gear 114 drives the latter clockwise and in consequence drives gear 109 clockwise rotating tray 91 counterclockwise 240° to the position of Fig. 4. When toothed section 119a moves out of mesh with gear 116, the pan dwells in the position of Fig. 4 because dwell portions 119d and 118c are aligned with teeth of respective gears 116 and 113. Gear portion 118b next comes into mesh with gear 113 and rotates the pan 91 oppositely 120° to the position of Fig. 5. As gear portion 118b moves out of mesh with gear 113 as shown in Fig. 24, gear portion 119b of gear 119 moves into mesh with gear 114 as shown in Fig. 20 and reversely rocks or rotates the pan 91 through a clockwise rotation to the position of Fig. 6.

Further rotation of the gears 118 and 119 causes gear portion 118a of gear 118 to engage idler gear 116 and to rotate gear 109 and the pan 91 counterclockwise to bring pan 91 into the position of Fig. 7, which is the same as that of Fig. 2. Thus, each revolution of gears 113 and 114 first causes a 240° counterclockwise rotation of pan 91 from its position of Fig. 2, then a rocking clockwise and counterclockwise each through 120° arc and a return clockwise rotation of 240° to its initial position.

During this movement of pan 91, the xerographic element or plate 19 on carrier 20 is drawn toward the pan 91 so that its latent image bearing surface becomes engaged in sealing relationship with the rubber peripheral flange 96 and seals the opening 94. Thus, the development powder P in the pan 91 is prevented from escaping therefrom while the pan is being rocked and oscillated by the gear train 112 during development.

Sealing of element to developer pan

The movement of the carrier 20 toward and away from the peripheral flange 96 to provide for temporary sealing of the element to said pan 91 is effected by the rotation of the cam carrying shaft 54 to cause its cams 46 and 47 to be correspondingly rotated. These cams operate on the cam follower frames 44 and 45 to cause translatory movement of the latter. This in turn results in axial shifts of the rods 34 and 35 and corresponding to and fro movements of the guide rails 30 and 31 carrying the carrier frame 20 with respect to the sealing flange 96 on pan 91. Rotation of the cam carrying shaft 54 in appropriate direction is effected by the gears 120 and 121 mounted on said shaft 54. These gears 120 and 121 (Fig. 14) respectively are meshable with the arcuate racks 122, 123 (Fig. 13). Racks 122 and 123 are supported in fixed positions so that gears 120 and 121 are in mesh with said racks in the home position of developer pan 91 as shown in Figs. 13 and 16. At such time the cams 46 and 47 are in such position relative to yokes 44 and 45 that the carrier guide rails 30 and 31 and consequently carrier 20 are in an elevated position relative to the flange 96 of said pan 91 (Fig. 13). As the pan starts to rotate under influence of the gear train 112, the gears 120 and 121 meshing with segmental racks 122 and 123 also rotate and rotate cams 46 and 47 to move yokes 44 and 45 and with them the guide rails 30 and 31 and consequently carrier 20 toward the pan 91 to bring the image bearing face of the xerographic element 19 into sealing relationship with the flange 96 of said pan 91. As this occurs, gears 120 and 121 ride off racks 122 and 123 and cams 46 and 47 remain in their sealing positions until the pan 91 is again restored to the home position of Fig. 7 at which time the gears 120 and 121 re-engage racks 122 and 123 and rotate cams 46 and 47 to initial position. This permits springs 36 and 37 to lift the carrier 20 with its xerographic element 19 away from sealing flange 96 of pan 91. The said segmental racks 122 and 123 are dimensioned in arcuate span so that they have no effect on gears 120 and 121 during the rocking movements of pan 91 but act only on said gears at the start and end of each rocking cycle of said pan 91.

After the development pan 91 has been restored to its home position and carrier 20 has been elevated relative to it, the xerographic element bearing the powder image thereon may be withdrawn through the side opening 18 for further treatment and reproduction of its powder image commonly used in xerographic procedure.

Operation

Briefly, the operation of the arrangement described is as follows: The xerographic plate or element 19 to be exposed and developed is inserted through opening 18 into the carrier 20 which is in a home position in guide rails 30 and 31 and overlies but is spaced from a sealing flange 96 of the developed pan 91. Then an appropriate switch (not shown) is closed to operate motor 75 in appropriate direction to cause driving rotation of pinions 64, 65, 76 and 77 to move or transport the carrier 20 bearing plate 19 from rails 30 and 31 onto guide rails 56 and 57 and to the limit permitted thereon by the end stops thereof at which time the carrier arrives in its exposure position. Slip clutch 74 prevents damage when carrier 20 strikes said end stops and before motor 75 is halted. In its horizontal traverse from home position to exposure position, the photoconductive layer of the xerographic plate or element 19 sweeps past the corona discharge wires or means 89 and receives the requisite electric charge. Thereafter the current supply to needles 89 is disconnected.

On arrival of the carrier 20 in the exposure position, the shutter (not shown) of the lens system of the bellows B is opened for the necessary exposure time of the copy object M. After completion of exposure time the shutter is closed and motor 75 run in reverse direction to cause gears 64, 65 and 76, 77 to return carrier 20 to its home position over pan 91. Here again the slip clutch 74 prevents damage when carrier 20 abuts stops 86, 87 before motor 75 is stopped.

Motor 110 is now started to cause gear train 112 to move the developer pan 91 through the developer cycle of Figs. 2–7, inclusive, during which time the developer powder P in pan 91 is cascaded or passed across the face of the latent image bearing surface of the xerographic element 19 due to the rocking motion of said pan 91. The powder clings to the said surface to develop the latent image thereon in usual manner. When pan 91 returns to its home position, namely, that of Fig. 7, the xerographic element 19 bearing the developed powder image is elevated from sealing relationship with the flange 96 of pan 91 and may be removed by the operator via opening 18 for further treatment such as transfer and duplication in usually known ways.

The current supply for required energization of motors 75 and 110 and the corona discharge element can be arranged for automatic sequential operation by conventional time switches, limit switches and the like to make the entire operation automatic from the moment of insertion of the xerographic element 19 into carrier 20 to the moment of its withdrawal after exposure and development as is well understood in the art.

Crank operated developer pan rocking (Figs. 27 and 28)

The cycle of rocking motions of developer pan 91 effected by gear train 112 by unidirectional drive of motor 110 may be achieved by other means as shown, for example, in Figs. 27 and 28. Therein the unidirectional drive motor 130 is arranged to rock the developer pan 91 in its required cycle by crank driven mechanism 131.

Gear 109 on the developer pan rock shaft 97 is coupled at will to the latter through the pin 108 on disk 107 by manipulation of knob 105 as hereinbefore described. Gear 109 which floats on shaft 97 meshes with a gear 132 which is supported for rotation on a stub shaft 133. A crank pin 134 extends laterally from a disk 135 secured to gear 132. A connecting rod or link 136 is coupled to crank pin 134 and at 137 to a crank 138. The crank 138 is secured to a shaft 139 which in turn carries a sprocket 140. Sprocket 140 is connected by a chain 141 to a driving sprocket 142 on the drive shaft 143 of motor 130. Thus, each single revolution of the drive shaft 143 through the agency of crank 138 and connecting rod 136 causes oscillation of gear 132 on stub shaft 133. This causes corresponding oscillation of gear 109 and consequently of shaft 97 and the developer pan 91. The angular sweep of oscillation is dependent upon the gearing ratio between gears 109 and 132 as well as upon the dimensions of crank 138 and connecting rod 136. Since each revolution of motor shaft 143 causes a single departure swing of pan 91 from its home position and a single return swing, only two pass sweep or cascading of the powder in pan 91 over the latent image bearing surface of element 19 occurs with this arrangement in contrast to the four pass sweep or cascading that occurs when gear train 112 is used. For many purposes powder images developed by use of two pass crank operated rocking mechanism is satisfactory. When four pass cascading is necessary this can be secured with gear train 112.

Cam operated developer pan motion (Figs. 29 and 30)

The gear train 112 or the crank driven mechanism 131 may be replaced if desired by cam controlled mechanism as illustrated in Figs. 29 and 30. As seen in Fig. 29, a cam plate 145 is fixedly mounted for rotation with shaft 139 which is driven as by motor 130 in the manner and with the means of Figs. 27 and 28. The cam plate 145 is provided with a continuous surface cam groove 146 in which a cam follower 147 protruding from a face of gear 132a engages. The closed cam groove 146 is shaped and positioned with respect to the axis of rotation of shaft 139 so that for each rotation of the latter the cam follower 147 will effect oscillation of gear 132a and of gear 109 meshing with it through clockwise and counterclockwise angles of 240° as shown in Fig. 30 or any other selected angles to provide two pass cascading of the powder P in pan 91 across the latent image bearing surface of the xerographic plate or element 19.

Any other mechanically convenient means for effecting either four or two pass development powder cascading across the required surface of the xerographic element may be employed.

Front entrance modification (Figs. 31–36, inclusive)

In this modification, arrangement is made to insert the xerographic element that is to be exposed and developed through an opening located at the front rather than at the side of the machine. This makes it more convenient for a single operator both to handle the xerographic plate and the original matter being copied. With the arrangement of this modification, the xerographic plate or element is inserted into the machine through an opening located at the front of the machine and protected by a suitable light trap. As the plate is inserted, it is gripped along its side edges by appropriate feed rolls which act to draw the plate into the housing over a stationary charging device and to transport the charged plate to the exposure position. After exposure, the exposed plate is transported by appropriate feed rolls into a plate holder located over the developer pan. The developer pan is then rotated through a complete revolution by an appropriate intermittent or Geneva gearing arrangement to provide two passes of the developer powder in the pan over the exposed plate. At the outset of the rotary motion (i. e. in its first 15° of rotation) of the developer pan, the plate in its plate holder is clamped against the sealing flange about the developer pan opening to prevent escape of the powder from the pan during its further development rotation.

The Geneva gear arrangement is such that rotation of the developer pan stops temporarily about 15° from its horizontal or normal position after 345° of rotation. In this stopped position, the plate and plate holder are unclamped relative to the sealing flange of the developer pan. The plate transport mechanism through introduction of an appropriate idler gear into part of its feed roll drive mechanism train, withdraws the plate from the plate holder and transports it to a cantilevered platform where other feed rolls continue transportation of the plate onto the platform. The weight of the plate as it is moved onto the platform causes it to shift to a horizontal position. In this position the plate on the platform is moved outwardly by the platform-held feed rolls sufficiently so that it can be withdrawn by the operator from a light sealed front opening located above the front plate or element insertion opening.

Referring in detail to Figs. 31 to 36 inclusive, the reference character 10a denotes the xerographic copier arrangement of this modification which is mounted for vertical adjustment on a pedestal 11a. This device includes bellows Ba for focusing its lens system (not shown) in, for example, the same manner as that of the first described embodiment hereof. The upper end of bellows Ba opens into the enclosing casing or housing 17a which carries the operative mechanisms of xerographic device 10a. These mechanisms include a plate-transporting arrangement for receiving inserted plates and transporting them into charging, exposing, developing and ejecting positions in appropriate sequential operation and also include charging mechanism for charging the xerographic plates or elements and developing mechanism to develop latent images on the exposed plates.

The xerographic plate or element 19 that is to be exposed and developed is inserted onto casing or housing 17a through an entrance opening 18a located at the front of housing 17a. This opening is provided with a light trap or seal (not shown) of conventional construction. The opening 18a is horizontally disposed and is aligned with horizontally disposed guides 150 supported internally of the casing 17a in any desired way. The spacing between the guides 150 is dimensioned so that the side edges of the plate or element 19 inserted into casing 17a via opening 18a will be received and guidedly supported therein so that the plate may be advanced horizontally within said casing.

Plate transporting mechanism

The plate transporting or advancing mechanism includes spaced-apart driven feed rolls 152, 153, 154 operating respectively with idler rolls 155, 156 and 157 disposed in the guide path defined by the guides 150 so that successive pairs consisting of a driven feed roll and an idler roll will engage the xerographic plate frictionally and advance it along the guides 150. Driven rolls 152, 153 and 154 are all rotated in the same direction as by belts or chains 158, 159 and 160 of which belt or chain 160 is driven by a drive pulley or sprocket 161 carried on a motor driven shaft 162 which is rotated by a suitable motor (not shown).

The plate or element 19 is inserted via opening 18a into the entrance end of guides 150 that lies in advance of driven feed roll 152 and between the latter and idler roll 155. The feed roll 152 when driven seizes and feeds plate 19 forwardly along guides 150 toward second driven roll 153. The latter in turn continues the forward advance of plate or element 19 along the guides 150 toward the third drive roll 154.

Charging means 163 substantially identical with charging means 89 hereinabove described is positioned in the space between the feed rolls 152 and 153 underlying the lower or xerographic surface of the advancing plate or element 19 which is being advanced or transported along the guides by the action of feed rolls 152 and 153 toward feed roll 154. When leading end of the charged plate 19 becomes engaged between feed roll 154 and idler roller 157, an appropriate limit switch (not shown) stops the motor driving shaft 162 and consequently all drive action of the feed rolls 152, 153 and 154. The charged plate 19 then is at rest in guides 150 in an exposure position overlying the upper or inner end of the bellows Ba and may be exposed for the required period of time by opening the shutter (not shown) of the lens system (not shown) located at the lower or outer end of bellows Ba.

After exposure of the charged plate 19 to copy has been effected in usual way, the driving feed rolls 152, 153 and 154 are reenergized by restarting the motor driving shaft 162 to advance the exposed plate 19 from guides 150 to developer mechanism 165 located at a developer position in casing 17a.

Developer mechanism

The developer mechanism includes a developer pan 166 similar to developer pan 91. The pan 166 has a closed, substantially V-shaped bottom 167. The top 168 of the pan has an opening 169 of substantially rectangular shape provided with an upwardly extending resilient peripheral sealing flange 170 of rubber or the like insulative material whose dimensions define an area equal to or somewhat larger than the area of the exposed surface of the xerographic element or plate 19.

Developer pan 166 is supported by a horizontally disposed shaft 171 in a manner similar to the support of developer pan 91 so that the flanged opening 169 lies normally below the horizontal feed path of the exposed plate 19 which is transported to the pan 166 for development after it has been exposed.

A plate holder 172 which generally is a rectangular open frame in shape is mounted pivotally at 173 to fixed brackets 173a extending from the upper surface 168 of the pan 167. Guides 172c in opposite side walls of the plate holder 172 serve to receive and guide the movement of the exposed plate 19 into and out of said holder 172 via its open end 172a. The opposite end 172b of the holder 172 is closed. The pivotal support at 173 of the holder 172 is located in proximity to its closed end 172b so that the bottom of frame 172 may be swung on the pivotal support 173 to bring the said bottom and any exposed plate 19 carried by the holder into sealing surface contact with the resilient peripheral flange 170 of the developer pan 167 so as to prevent leakage of developer powder P from the pan 167 during its developer rotation on shaft 171. This pivotal swing of plate holder 172 is arranged to be effected automatically as will be presently described.

Feed rolls 174 (see Figs. 31, 32 and 36) are mounted on a driven shaft 175 which spans the width of the holder 172 adjacent its open end 172a. Idler rollers 176 are supported rotatively on arms 177 of bell cranks 178 which are pivoted respectively at 179 to the opposite sides of plate holder 172. The other arms 180 of the bell cranks respectively engage biasing springs 181 which bias the bell cranks 178 about their pivots 179 in a direction to swing idler rolls 176 toward the feed rolls 174 with sufficient pressure to cause effective frictional engagement of the exposed plate 19 fed between the feed rolls and idler rolls 174 and 176, for positive feed of the plate 19 into and out of the plate holder 172 whenever the feed rolls 174 are driven in appropriate direction. The spring pressure of spring 181 may be adjusted by the pressure adjusting screws 182.

A driven spur gear 183 is fixed to the feed roll shaft 175. This driven gear 183 is adapted to be driven in one direction to feed an exposed plate 19 into the plate holder 172 for development purposes or in the opposite direction to feed the plate 19 out of the plate holder 172 after its development has been effected.

Motive power for driving the gear 183 in required direction is preferably provided from the motor driven shaft 162 which also drives the belts or chains 160, 158 and 159 and which shaft always has unidirectional rotation. In order to secure the desired direct and reverse rotational drives of gear 183 from the unidirectional motor driven shaft 162, a drive gear 184 is secured to said shaft 175. An idler gear 185 is supported by a bracket 186 to mesh with the drive gear 184 and to lie in such position that in the initial or receiving position of the developer pan 167 and its plate holder 172 as shown in Figs. 31 and 32, the gear 183 also meshes with idler gear 185. With such gearing conditions the unidirectional rotation of drive shaft 162 whenever the latter is driven causes the belts or chains 160, 159 and 158 to operate feed rolls 154, 153 and 152 to transport or advance the exposed plate 19 from the guides 150 into the guides 172c of plate holder 172 through its open end 172a. As the plate 19 is moved between feed rolls 174 and idler rolls 176 of the plate holder 172, feed rolls 174 are rotating in the same direction as feed rollers 154, 153 and 152 and act to move the entire exposed plate 19 into the guides 172c of the plate holder 172 to a position whereat the exposed portion of the plate overlies the flanged rim 170 of the developer pan 167. When this position of the plate 19 is achieved, the gear 183 is moved out of mesh with idler gear 185, as will be described, to stop further inward advancing movement of the plate.

It is obviously desirable for simplicity of mechanical design to effect required disengagement of gears 183 and 185 by the clamping swing of the plate holder 172 about its pivot 173. This swing must occur after the plate 19 has been positioned in the plate holder 172 as just described so as to clamp the exposed face of plate or element 19 to the resilient peripheral sealing flange 170 of the developer pan to effect a seal. The angle of swing of holder 172 on which the shaft 175 carrying gear 183 is supported is sufficient to unmesh gear 183 from idler gear 185.

Developer pan rotation

In order to effect the required swing of plate holder 172 on its pivot 173, arrangement is made to utilize the rotary developing movement of the developer pan 167 about its shaft 171. This movement constitutes a single revolution of the developer pan 167 as controlled by intermittent or Geneva gears 187 and 188 secured respectively to the pan supporting shaft 171 and to a motor driven shaft 189. The Geneva gear train is so arranged that, for each revolution of the developer pan 167, starting from the plate loading or receiving position shown in Figs. 31 and 32, the gears 187 and 188 will first rotate the pan approximately 345° to an ejection position shown in Fig. 35, pause in this ejection position for a determined length of time sufficient to effect withdrawal of the plate from the plate holder 172 and then complete the remaining 15° of its revolution to return to its starting or plate loading position ready to receive a succeeding plate for development. During the 345° portion of the rotation of pan 167, the development powder P in the pan is cascaded or passed twice across the surface of the exposed plate 19 to develop the latent image thereon. In the first 15° of rotation of the developer pan 167, the clamping swing of the plate holder 172 on its pivot 173 is effected.

Sealing movement of plate holder

To provide this clamping swing as well as an unclamping swing of the plate holder 172 later on when the developer pan 167 reaches its ejection position, a trip cam 190 is mounted on a stub shaft 191 rotatively carried by the developer pan 167. A fixed stop 192, secured in conventional way to a fixed part (not shown) of the housing 17a, is so positioned that it engages an abutment surface 193 of the cam 190 when the pan 167 is in its normal or initial position as shown in Fig. 32 so that immediately at the outset of developer rotation of pan 167 a rotary displacement or movement will be given to the cam 190 as it is swept past the fixed stop 192. A gear 194 secured to the cam shaft 191 is rotated in the same direction and to the same extent as the cam 190. A rotatively supported gear 195 is carried by the pan 167 in meshing relationship with the gear 194. A disc 196 is secured to a face of the gear 195 for rotation with it. An eccentrically disposed crank pin 197 extends laterally from the disc 196. A link 198 engages both the crank pin 197 and a pivot pin 199 secured to the plate holder 172. With this arrangement the described rotation imparted to cam 190 and its gear 194, similarly rotates gear 195 and moves crank pin 197 from its elevated position shown in Fig. 33 and consequently causes link 198 to move with it to swing the frame 172 about its pivot 173 toward the upper surface of pan 167 and effects a tight sealing engagement between the exposed surface of plate 19 and the resilient peripheral flange 170 of the developer pan. This sealing engagement occurs during approximately the first 15° of rotation of the developer pan 167 and remains effective until just before the pan completes the first 345° of its revolution. At this time a second fixed stop 200 engages the abutment surface 201 of the cam 190 and rotates it as well as gear 194 in opposite direction, thus causing the link 198 to swing the plate holder 172 about its pivot 173 outwardly away from the sealing engagement with flange 170. This outward unclamping swing is completed at substantially the time the developer pan 167 completes the first 345° of its developer revolution and at such time the gear 183 that operates feed rolls moves into mesh directly with the driving gear 184 (Fig. 35) and causes feed rolls 174 to rotate in opposite direction to their direction of rotation which occurred when gear 183 meshed with idler gear 185, thus causing rolls 174 now to feed the developed plate 19 outwardly of the plate holder 172.

The developed plate 19 which is fed outwardly of the holder 172 by the feed rolls 174 at an angle of approximately 15° with the horizontal is fed between driven feed and idler rolls 203, 204 (Fig. 31) and of which feed roll 203 is driven by a sprocket or pulley 205 that is rotated by the chain or belt drive 160. Once the developed plate 19 is gripped between rolls 203 and 204 it is advanced or transported by driven feed roll 203 onto a cantilevered frame-like platform 206. This platform 206 is biased freely on the shaft of roll 203 into an angular disposition approximately 15° with the horizontal by a spring 207 which acts normally to swing the platform into the full line position shown in Fig. 31 against a fixed stop 208.

As the developed plate 19 is moved onto the platform 206 by driven feed roll 203, its weight counteracts the biasing action of spring 207 and swings the platform 206 into the broken line position shown in Fig. 31, at which time the feed roll 203 further transports the leading edge of the developed plate 19 on platform 206 toward an outlet opening 209 also protected by a conventional light seal (not shown). The developed plate may then be seized by the operator and withdrawn from the casing 17a via the opening 209.

For focusing purposes, a ground glass focusing panel 210 is supported in a frame 211. The frame 211 is pivoted frictionally at 212 from a fixed part 213 in the housing 17a so that its panel 210 may be swung from the elevated angular position shown in Fig. 31 to the horizontal focal plane in the exposure position over the bellows Ba. An appropriate sight opening 214 in the top of casing 17a provided with a removable cover 215 facilitates observation of the panel 210 when in its focusing position. After focusing has been completed, the panel 210 and its frame 211 are swung on friction pivot 213 to the angular position shown in Fig. 31 so as not to interfere with transport of the xerographic plate 19 during charging, exposure, development and removal thereof from the housing 17a.

It is to be understood, of course, that the required sequential driving operations on the various feed rolls and of the developer pan and energization of the charging mechanism as well as of operation of the shutter at appropriate exposure time in the cycle from insertion of the unexposed plate to removal of an exposed and developed plate can be controlled automatically by conventional switches and limit switches and the like arranged in conventional electric circuits.

With the arrangement shown, it is possible, if desired, to provide a storage magazine internally of the casing for holding a plurality of xerographic elements in superposed relationship over the exposure position, i.e. over the inner opening of the bellows Ba. The plates or elements are lowered one at a time onto the guides 154 at the exposure position. Prior to being lowered, the plates are charged by a charging grid in conventional manner. The grid is guided to traverse the xerographic surface of each succeeding plate. After the lowermost plate in the exposure position has been exposed, it is shifted laterally for engagement by the feed rolls 154 and moved through the developer stage and eventually out of the casing by the same mechanisms provided for this purpose in Figs. 31-36 inclusive. After a plate has been exposed and transported for development, the plate magazine is actuated manually to bring a fresh plate into the exposure position, so that while the first plate is being developed the next one is being exposed. Such an arrangement speeds up the handling of exposure and development of xerographic plates or elements and reduces required plate manipulation by the operator during the exposure and development cycle.

While specific embodiments of the invention have been described and shown, variations in arrangement and structural detail within the scope of the claims are possible and contemplated. There is no intention, therefore, of limitation to the exact details shown and described.

What is claimed is:

1. A xerographic device including a housing into which a xerographic element is insertable for sequential charging, exposure and development, means within the housing for charging the element after its insertion into the housing, transport means operatively mounted in said housing for transporting the element successively to exposure, development and removal positions within the housing, said means including guides and feed rolls which latter engage frictionally with said element, an element holder in the development position into which said element is moved by the feed rolls after exposure, a developer pan for developer powder at said development position, means for temporarily establishing and maintaining a seal between said pan and said element during development at said development position, means for moving the pan while the seal is maintained to pass the development powder across the exposed surface of said element to effect development of said image, and means for thereafter transporting said element outwardly of said holder and away from said development position to a removal position.

2. The xerographic device of claim 1 including unidirectional driving means for rotating all the feed rolls, and means for reversing rotational direction of selected of the feed rolls without altering the operation of the uni-directional driving means.

3. The xerographic device of claim 1 including a tiltable platform normally biased into a position to receive said element as it is moved outwardly of said holder, said platform being tiltable by the weight of said element thereon into a position facilitating removal of said element from said device.

4. A xerographic apparatus for sequentially charging, exposing and developing individual xerographic plates comprising a plate carrier for supporting a xerographic plate, carrier transport means for moving the plate carrier from a loading position to an exposure position and to a developing position, charging apparatus located intermediate the plate loading and exposure positions for charging the plate in transit therebetween, an open tray mounted in the developing position for rotational movement and containing powdered developing material, means to engage the plate with the developing tray whereby to form a powder tight container, means for rotating the developing tray to cascade developing material over the plate surface, and means for releasing the plate from the developing tray.

5. A xerographic device for sequentially charging, exposing and developing individual xerographic plates including a housing into which a xerographic plate is insertable, a plate carrier movably mounted in said housing for supporting the xerographic plate, carrier transport means for moving the plate carrier from a loading position to an exposure position and to a developing position, charging apparatus located intermediate the plate loading and exposure positions for charging the plate in transit therebetween, a developer pan for developer powder rotatably mounted in the developing position, said developer pan having an opening over which the plate is disposed during its development, and developer pan actuating means operatively connected to said pan including means to temporarily engage the plate with said developer pan to form a powder tight container and means to move said developer pan about a horizontal axis to pass developer powder across the surface of the plate.

6. The xerographic device of claim 5 wherein said means for moving said developer pan includes power driven gear means operatively connected to said developer pan to effect oscillatory movement of said developer pan.

7. The xerographic device of claim 5 wherein said means for moving said developer pan includes power operated cam means coupled to said developer pan to effect oscillatory movement of said developer pan.

8. The xerographic device of claim 5 wherein said means for moving said developer pan includes power driven crank and connecting rod means operatively connected to said developer pan to effect oscillatory movement of said developer pan.

9. The xerographic device of claim 5 wherein said means for moving said developer pan includes a uni-directional motor, coupling means operatively connected to said motor and said developer pan to effect oscillatory movement of said developer pan from the uni-directional rotation of said motor.

10. The xerographic device of claim 5 wherein said means for moving said pan includes power driven gear means operatively connected to said developer pan to effect intermittent oscillatory movement of said developer pan.

11. The xerographic device of claim 5 wherein said means to temporarily engage the plate with said developer pan to form a powder tight container includes a sealing flange about the periphery of the opening of said developer pan, and power driven cam means for moving the plate into pressing engagement with the said sealing flange on said developer pan.

12. The xerographic device of claim 5 wherein said means to temporarily engage the plate with said developer pan to form a powder tight container includes a sealing flange about the periphery of the opening of said developer pan, stops in fixed positions relative to the rotational movement of the developer pan, cam means carried by said developer pan and having surfaces engageable with said stops during rotation of the pan to displace the cam means, and gear actuated coupling means operatively connected to said cam means and said plate carrier for moving the plate carrier and a plate carried therein toward and away from sealing relationship with said sealing flange on said developer pan in response to displacements of said cam means.

13. A xerographic apparatus for sequentially charging, exposing and developing individual xerographic plates comprising a plate holder for supporting a xerographic plate, transport means for moving the plate from a loading position to an exposure position and to a developing position, charging apparatus located intermediate the plate loading and exposure positions for charging the plate in transit therebetween, an open developer pan mounted in the developing position for rotational movement and containing powdered developing material, means to engage the plate with the developing pan whereby to form a powder tight container, means for rotating the developing tray to cascade developing material over the plate surface, and means for releasing the plate from the developing pan.

References Cited in the file of this patent

UNITED STATES PATENTS

| | | |
|---|---|---|
| 2,221,776 | Carlson | Nov. 19, 1940 |
| 2,357,809 | Carlson | Sept. 12, 1944 |
| 2,526,840 | Bass | Oct. 24, 1950 |
| 2,578,498 | Bass | Dec. 11, 1951 |
| 2,600,580 | Sabel et al. | June 17, 1952 |
| 2,701,764 | Carlson | Feb. 8, 1955 |